April 9, 1929.  E. W. DAVIS  1,707,977

NIPPLE

Filed April 11, 1927

Inventor:
Ernest W. Davis
By: Williams, Bradbury,
McCaleb & Hinkle
Atty's.

Patented Apr. 9, 1929.

1,707,977

UNITED STATES PATENT OFFICE.

ERNEST W. DAVIS, OF OAK PARK, ILLINOIS, ASSIGNOR TO ALEMITE MANUFACTURING CORPORATION, OF CHICAGO, ILLINOIS, A CORPORATION OF DELAWARE.

NIPPLE.

Application filed April 11, 1927. Serial No. 182,573.

My invention relates to nipples and is more particularly concerned with lubricant receiving nipples adapted to form part of a high-pressure lubricating system, such as that disclosed in Patents Nos. 1,307,733 and 1,307,734 to Arthur V. Gullborg.

Lubricating systems of this type comprise a plurality of valved nipples or fittings adapted to be secured to the bearings of a machine to be lubricated, and a lubricant compressor for supplying lubricant at high pressure and provided with a discharge conduit terminating in a nozzle or coupling member which may be rapidly attached to and detached from the lubricant receiving nipples in succession.

The preferred form of interlocking means for attaching the coupling to the lubricant receiving nipples comprises a well-known bayonet lock, and it is to nipples provided with this type of coupling means that my invention relates.

An object of my invention is to provide a new and improved nipple.

Another object is to provide a lubricant receiving nipple having a valved inlet end and a valve spring having a length substantially equal to that of the nipple.

Another object is to provide a nipple having a larger and more serviceable valve spring.

Another object is to provide a nipple which may be more easily assembled than the present nipple.

Further objects and advantages will appear as the description proceeds.

Figure 1:
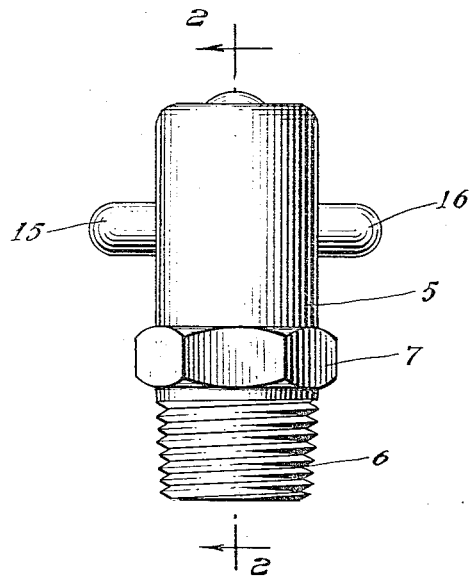
Fig. 1 is a side elevation of my new and improved nipple.
Figure 2:
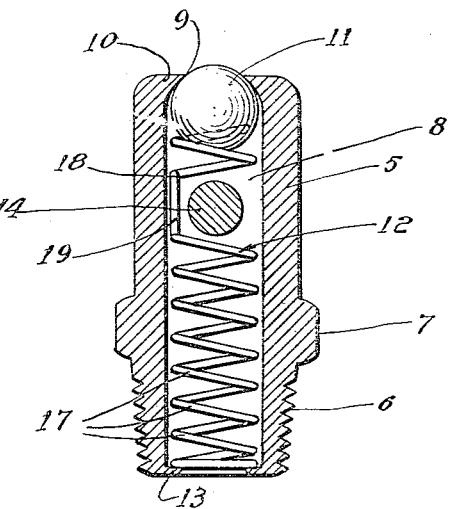
Fig. 2 is a section on the line 2—2 of Fig. 1.

Referring to the drawing, my nipple has a body 5, preferably composed of brass or other comparatively soft material and provided with a threaded end 6, whereby the nipple may be secured in the end of a passage leading to a bearing to be lubricated. Adjacent the threaded end 6 is a part 7, preferably hexagonal in cross section and adapted to co-operate with a wrench for screwing the nipple into the end of the passageway leading to the bearing. The body 5 is further provided with a bore 8 terminating at one end in an inlet 9, surrounded by a valve seat 10.

Co-operating with the valve seat 10 is a valve 11, preferably spherical in shape and urged against said seat by a spring 12 located in the bore of the nipple and retained therein by the turned over part 13 at the discharge end of the bore 8. This spring has a length only slightly less than the length of the body 5 and is a special modification of the ordinary coil spring, the modification being provided for the purpose of avoiding the pin 14 which extends transversely across the bore 8. This pin has projecting ends 15 and 16 for co-operating with a slotted coupling member attached to the discharge end of a lubricant compressor (not shown) and forms part of the means for firmly interlocking the nipple and the coupling during the lubricant injecting operation. This pin is preferably made of steel or other strong material for resisting the heavy strains imposed thereon.

The novel spring which I employ comprises a plurality of coils 17 of equal diameter and disposed along the longitudinal axis of the spring, and a deformed portion 18 consisting of a straight axial portion 19 which takes the place of one or more coils and which, in the assembled nipple, lies between the pin 14 and a side of the bore 8. The length of the axial portion 19 is considerably greater than the diameter of the pin 14, in order to permit free movement of the adjacent coils toward and from said pin without interference, thus insuring equal compression and tension in all parts of the spring 12.

In assembling my new and improved nipple, the valve 11 and spring 12 are positioned in the bore of the nipple and the part 13 turned over to maintain them in this position. Thereafter the pin 14 is driven into a transverse bore in the nipple which has been provided for this purpose, the pin being retained in place by friction. In thus inserting the pin in the body of the nipple, the rounded, forward end of the pin will serve to push aside the axial part 19 of the spring 12, should this part lie in the path of the pin being inserted.

Having thus illustrated and described a preferred embodiment of my invention, what I claim and desire to secure by United States Letters Patent is:

1. In a lubricating apparatus of the class described, a lubricant receiving nipple comprising a body having a passage therethrough, coupling means extending transversely of said passage, a valve for said passage and a valve spring having a resilient part on opposite sides of said means and a deformed part for connecting said resilient parts and avoiding said coupling means.

2. In a lubricating apparatus of the class described, a lubricant receiving nipple comprising a body having a passage therethrough, a coupling pin extending transversely of said passage, a valve in said passage and a coiled spring for closing said valve, said spring having a deformed part for avoiding said pin.

3. As an article of manufacture, a lubricant receiving nipple comprising a body adapted to be secured to a part to be lubricated, a passage through said body, a coupling pin extending transversely of said passage and projecting from opposite sides of said body, a valve in said passage and a coiled spring for said valve, said spring having an axial portion adapted to lie opposite said pin.

In witness whereof, I hereunto subscribe my name this 6th day of April, 1927.

ERNEST W. DAVIS.